May 21, 1935.   C. FROHMER   2,002,369
ELECTRIC CONTROL MEANS
Original Filed Nov. 18, 1932
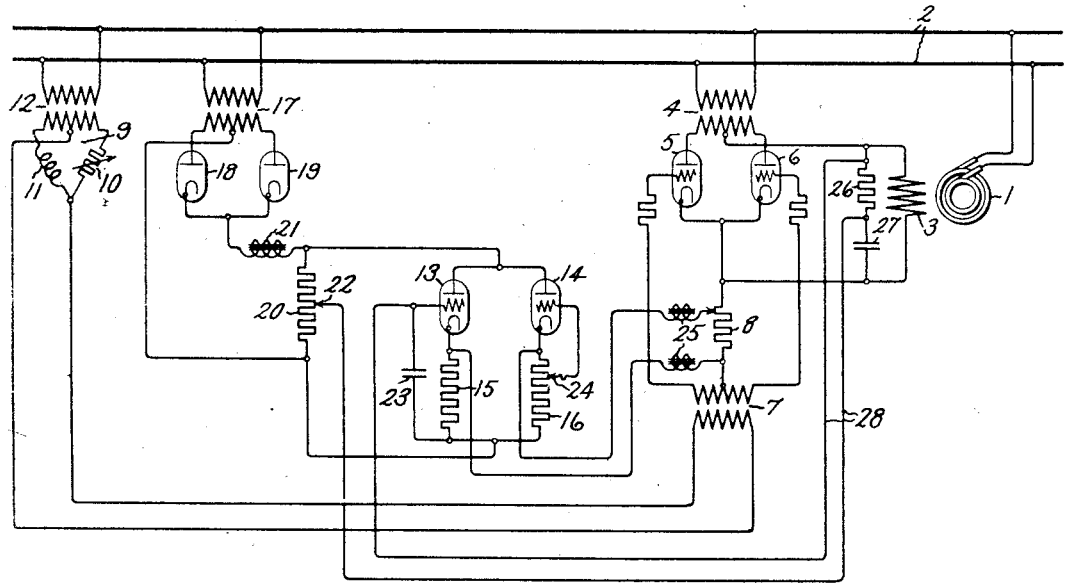
Inventor:
Claus Frohmer,
by Charles V. Tullar
His Attorney.

Patented May 21, 1935

2,002,369

UNITED STATES PATENT OFFICE 2,002,369

ELECTRIC CONTROL MEANS

Claus Frohmer, Berlin-Charlottenburg, Germany, assignor to General Electric Company, a corporation of New York Application November 18, 1932, Serial No. 643,248. Renewed October 27, 1934. In Germany November 25, 1931

9 Claims. (Cl. 171—119)

My invention relates to electric control means, and more particularly to electric regulators utilizing electric discharge devices for controlling an electrical characteristic of a dynamo-electric machine or circuit.

Automatic regulating systems employ some form of control element or device responsive to the condition to be regulated as a reference standard. In electro-mechanical regulators some form of relay with moving parts is usually employed as the reference standard whereas in regulators utilizing electric discharge devices some control element or device is usually preferred which has neither contacts nor moving parts. Many of the control elements proposed for regulating systems utilizing electric discharge devices are very elementary in character and are incapable of producing the fine degree of regulation required for stable operation of a machine or circuit under the various conditions of operation encountered in practice, due to lack of sensitivity in the control element and failure to provide suitable anti-hunting means.

It is an object of my invention to provide an improved circuit for detecting by means of electric discharge devices changes in an electrical characteristic of a circuit with a high order of accuracy.

It is another object of my invention to provide an improved regulating system employing electric discharge devices applicable for use in regulating alternating current dynamo-electric machines.

It is a further object of my invention to provide, in a regulating system employing electric discharge devices for controlling an electrical characteristic of a dynamo-electric machine, improved means for preventing hunting.

In accordance with my invention I provide electric circuit control means for producing a current or voltage proportional to variations of an electrical characteristic to be controlled by utilizing the difference between the anode currents of two grid controlled electric valves arranged in the form of an electric bridge. The difference voltage from the bridge circuit is utilized to vary the conductivity of electric valves, preferably of the vapor type, which are connected to energize the excitation circuit of a dynamo-electric machine and thereby control the terminal voltage of the machine. In order to avoid hunting, variations in the excitation current are utilized to provide an auxiliary voltage which is super-imposed on the grid circuit of one of the control valves.

My invention will be better understood from the following description taken in connection with the accompanying drawing and its scope will be pointed out in the appended claims.

In the drawing, the single figure is a diagrammatic representation of an embodiment of my invention in a regulating system for an alternating current dynamo-electric machine.

Referring to the drawing, I denotes a dynamo-electric machine shown as a single phase alternating current generator which is connected to a power circuit 2. The generator 1 is provided with an excitation circuit indicated by the field winding 3 which is connected to be energized from the terminals of the generator, or any other suitable alternating current source. This arrangement includes a transformer 4 connected to be energized from the circuit 2 and a pair of electric valves 5 and 6 connected to form a full wave rectifier with the field winding 3 included in the direct current circuit of the rectifier. As will be well understood by those skilled in the art, the valves 5 and 6 are each provided with an anode, a cathode and a control grid and may be any of the several types well known in the art, although I prefer to use valves of the gaseous or vapor electric discharge type. The control grids of the electric valves 5 and 6 are connected to the common cathode circuit through opposite halves of the secondary winding of a grid transformer 7 and a variable resistor 8. The primary winding of the grid transformer 7 is energized from a circuit which includes a source of alternating potential which may be adjustably fixed at any desired phase relation by means of any suitable phase shifting circuit 9 which as illustrated comprises a variable resistor 10 and a reactor 11 connected across the secondary winding of a transformer 12, the primary winding of which is energized from the circuit 2.

The control element of the regulating system comprises two electric valves 13 and 14 connected in the form of an electric bridge of the Wheatstone type in the electrically adjacent arms thereof with resistors 15 and 16 connected in the remaining adjacent arms. The valves 13 and 14 are each provided with an anode, a cathode and a control grid and are preferably of the thermionic high vacuum type. The input terminals of this electric bridge are connected to be energized in accordance with a direct-current voltage derived from the electrical characteristic to be controlled. This arrangement includes a mid-tapped transformer 17 connected to be energized from electric discharge means illustrated as comprising a pair of two-electrode valves 18 and 19 connected to form a full wave rectifier. The direct current terminals of this rectifying circuit are connected across a resistor 20 through a smoothing reactor 21. The resistor 20 is connected across the input terminals of the electric bridge including the valves 13 and 14 and the resistors 15 and 16.

The grid circuit of valve 13 is connected by an adjustable connection 22 to a point intermediate the terminals of resistor 20 and since the voltage of resistor 20 corresponds to the voltage of the power circuit 2, the grid of valve 13 follows the voltage variations of the power circuit. A capacitor 23 is connected between the grid of valve 13 and the bridge input terminal of resistor 15 in order to damp the rapidity of regulation to a certain extent. The grid of the valve 14 is connected by an adjustable connection 24 to a point intermediate the terminals of resistor 16. The output terminals of the bridge circuit, which are the junction points between valve 13 and resistor 15, and valve 14 and resistor 16, are connected through smoothing reactors 25 across the grid resistor 8 of the vapor electric valves 5 and 6.

In order to increase the rapidity of regulation and avoid over-shooting or hunting I connect a resistor 26 and a capacitor 27 across the terminals of the excitation winding 3. The polarity of the capacitor 27 is changed for every change in the excitation voltage so that the resistor 26 is traversed by a charging or discharging current producing in this resistance a component of voltage which is used as an auxiliary voltage to be added to or subtracted from the grid voltage of the valve 13. As shown, conductors 28 are connected across resistor 26 and the terminals thereof are connected in series with the grid connection of valve 13 through the adjustable connection 22 to the resistor 20. This arrangement permits the use of a relatively small capacitance 23 and avoids over-regulation or hunting because the grid excitation is prematurely changed in a direction to change the conductivity of the valves 5 and 6 before the terminal voltage has reached its normal value. It will be obvious to those skilled in the art that the change in excitation current may be used instead of the voltage of the winding 3 for the purpose of generating the auxiliary voltage without departing from my invention in its broader aspects.

The operation of the illustrated embodiment of my invention is substantially as follows: When the electric valves 13 and 14 are of the same characteristics their anode currents are substantially the same when the grid voltages are equal. The potentials of the grids of the two valves are taken from the points 22 and 24 which are so set that the anode currents of the respective valves are equal when the electrical characteristic to be controlled, which in this case is the voltage of the power circuit 2, is of the desired value. For equal values of resistances 15 and 16 there would be no difference of potential between the output terminals of the bridge. A change in the voltage of the circuit 2 involves a change in the direct-current voltage applied to the resistance 20 and therefore a change in the grid potential of valve 13. The anode currents of the two valves are now unequal and as a consequence a voltage exists across the output terminal of the bridge and a corresponding current flows through resistance 8 in the grid circuit of the vapor electric valves 5 and 6. The direction of this current depends upon whether the altered grid potential of valve 13 is higher or lower than the value necessary for a balanced condition. The value of the difference current and therefore the extent of the voltage drop in the resistance 8 is proportional to the variation of the voltage of the circuit 2 from its predetermined normal value. The particular advantage of the arrangement described is that the ratios are independent of the anode voltage of the valves 13 and 14 because the characteristics of these two valves are uniformly affected by variations in the anode voltage.

In the arrangement illustrated, the current traversing the resistance 8 is used for controlling the excitation of the field winding 3 and thereby the voltage of generator 1. The point in the cycle of anode voltage at which the valves 5 and 6 become conductive is varied by changing the grid bias of these valves in a manner well known in the art. With the control bridge balanced the grid voltage of the valves 5 and 6 is purely alternating and is derived from the transformer 7. The valves become conductive at a point in the cycle of anode voltage depending upon the adjustment of the phase shifting circuit 9 to provide sufficient excitation for normal voltage at the given load condition. Any change in the voltage of circuit 2 causes the bridge circuit to unbalance in one direction or the other, change the direction of current flow through resistor 8, and thereby cause the grid bias to be positive or negative. If the grid bias is negative the valves 5 and 6 are rendered conductive at a later point in the cycle and thereby decrease the excitation of the generator whereas if the grid bias is positive the valves 5 and 6 are rendered conductive at an earlier point in the cycle and thereby increase the excitation of the generator.

The operation of the arrangement just described is modified to prevent over-shooting or hunting by means of the auxiliary transient voltage derived from the resistor 26 which is traversed by the charging or discharging current of capacitor 27. When the voltage of winding 3 is suddenly increased due to an increase in the output of the valves 5 and 6 the capacitor is charged and the charging current is arranged to provide a component of voltage which subtracts from the positive grid bias voltage and thereby renders the valves 5 and 6 conductive at a latter point in the cycle prematurely to the change effected by the increasing voltage of circuit 2. Similarly, if the voltage of the field winding 3 suddenly decreases, the capacitor 27 discharges through resistor 26 so as to provide a component voltage in the opposite direction which adds to the negative grid bias voltage and thereby renders the valves 5 and 6 conductive at an earlier point in the cycle prematurely to the decreasing voltage of circuit 2.

While I have shown and described a particular embodiment of my invention, it will be obvious to those skilled in the art that various changes and modifications may be made without departing from my invention in its broadest aspects and I, therefore, aim in the appended claims to cover all such changes and modifications as fall within the true spirit and scope of my invention.

What I claim as new and desire to secure by Letters Patent of the United States, is:

1. In combination, a control device comprising two pairs of impedances connected in the form of an electric bridge, two of said impedances comprising electric valves connected in electrically adjacent arms of said bridge and provided with a control grid, an electric circuit connected to control the potential of the control grid of one of said valves in accordance with a condition to be controlled, and an electric circuit connection to control the potential of the control grid of the other of said valves in accordance with the anode current of said other valve.

2. In combination, a control device comprising two parallel connected circuits each including a series connected electric valve and a resistance, each of said valves being provided with a control grid, means for energizing the control grid of one of said valves in accordance with an electrical condition to be controlled, and means for energizing the control grid of the other of said valves in accordance with the voltage drop across the resistance connected in series therewith.

3. In combination, an alternating current circuit, rectifying means connected to said alternating current circuit, a balance control device connected to be energized from said rectifying means and comprising a pair of electric valves and a pair of impedance elements connected in the form of an electric bridge wherein said valves are connected in electrically adjacent arms, each of said valves being provided with a control grid, means for controlling the potential of the control grid of one of said valves in accordance with the output voltage of said rectifying means, means for controlling the potential of the control grid of the other of said valves in accordance with the voltage drop of its electrically adjacent impedance, and means connected to be energized in accordance with an unbalanced quantity of said bridge for controlling an electrical characteristic of said alternating current circuit.

4. In combination, a control device comprising two pairs of impedances connected in the form of an electric bridge, two of said impedances comprising electric valves connected in electrically adjacent arms of said bridge and each being provided with a control grid, an electric circuit connected to control the potential of the control grid of one of said valves in accordance with a condition to be controlled, means for introducing a transient potential in the control grid circuit of said one of said valves, and an electric circuit connected to control the potential of the control grid of the other of said valves in accordance with the anode current of said other valve.

5. In combination, an electric discharge device provided with a control grid, means for controlling the conductivity of said discharge device comprising a resistance, a normally balanced bridge circuit comprising a pair of electric valves connected in electrically adjacent arms and a pair of impedance elements connected in the remaining electrically adjacent arms, each of said valves being provided with a control grid, means responsive to a variable condition to be controlled for varying the grid potential of one of said valves, means connected to the impedance electrically adjacent to the other of said valves for controlling the potential of the grid of said other valve, and means for varying the voltage across said resistance in accordance with the unbalance of said bridge.

6. In a regulating system, a dynamo-electric machine having an excitation circuit, means comprising an electric valve for controlling the energization of said excitation circuit, a normally balanced electric bridge circuit connected to be unbalanced in accordance with an electrical characteristic of said dynamo-electric machine for varying the conductivity of said valve, and means responsive to transient variations in an electrical characteristic of said excitation circuit for modifying the degree of unbalance of said bridge circuit in accordance with the direction of change of said transient variations.

7. In a regulating system, a generator having a field winding, means comprising an electric valve for controlling the energization of said field winding, a control device comprising two pairs of impedances connected in the form of an electric bridge, two of said impedances comprising electric discharge devices connected in electrically adjacent arms of said bridge and each being provided with a control grid, means responsive to an electrical characteristic of said generator for controlling the grid potential of one of said discharge devices, and means responsive to transient variations in an electrical characteristic of said field winding for modifying the grid potential of said one of said discharge devices in accordance with the direction of change of said transient variations.

8. In a regulating system, an alternating current generator having a field winding, means comprising an electric valve for energizing said field winding, a control device comprising two parallel connected circuits each including a series connected electric discharge device and an impedance, each of said discharge devices being provided with a control grid, rectifying means connected to said generator and to said control device for energizing said control device in accordance with an electrical characteristic of said generator, means for controlling the potential of the control grid of one of said discharge devices in accordance with the output voltage of said rectifying means, a capacitor and a resistor connected in series relation across said field winding, said resistor being connected in the grid circuit of said one of said discharge devices, and means for varying the conductivity of said valve in accordance with the output voltage of said control device.

9. In a regulating system, an alternating current generator having a field winding, means comprising an electric valve provided with a grid circuit for energizing said field winding, a phase-shifting circuit connected in the grid circuit of said valve, means comprising a resistance for introducing a variable bias potential in said grid circuit, a control device comprising two pairs of impedances connected in the form of an electric bridge, two of said impedances comprising electric discharge devices connected in electrically adjacent arms of said bridge and each being provided with a control grid, the other two of said impedances comprising resistance elements connected in the remaining electrically adjacent arms of said bridge, rectifying means connected to said alternating current generator and provided with an output circuit including a resistor, said bridge circuit being connected to be energized in accordance with the voltage across said resistor, an adjustable connection between an intermediate point of said resistor and the grid of one of said discharge devices, an adjustable connection between the grid of the other of said discharge devices and the resistance element electrically adjacent thereto, output terminals at the junction points between said discharge devices and said resistance elements connected to energize said resistance in the grid circuit of said valve, a capacitor and a resistance connected across said field winding, and means for connecting said last-mentioned resistance in series relation with the grid circuit of said one of said discharge devices.

CLAUS FROHMER.